Nov. 19, 1940.   J. M. BENJAMIN   2,222,393
ANTISKID CHAIN
Filed July 6, 1939   2 Sheets-Sheet 2
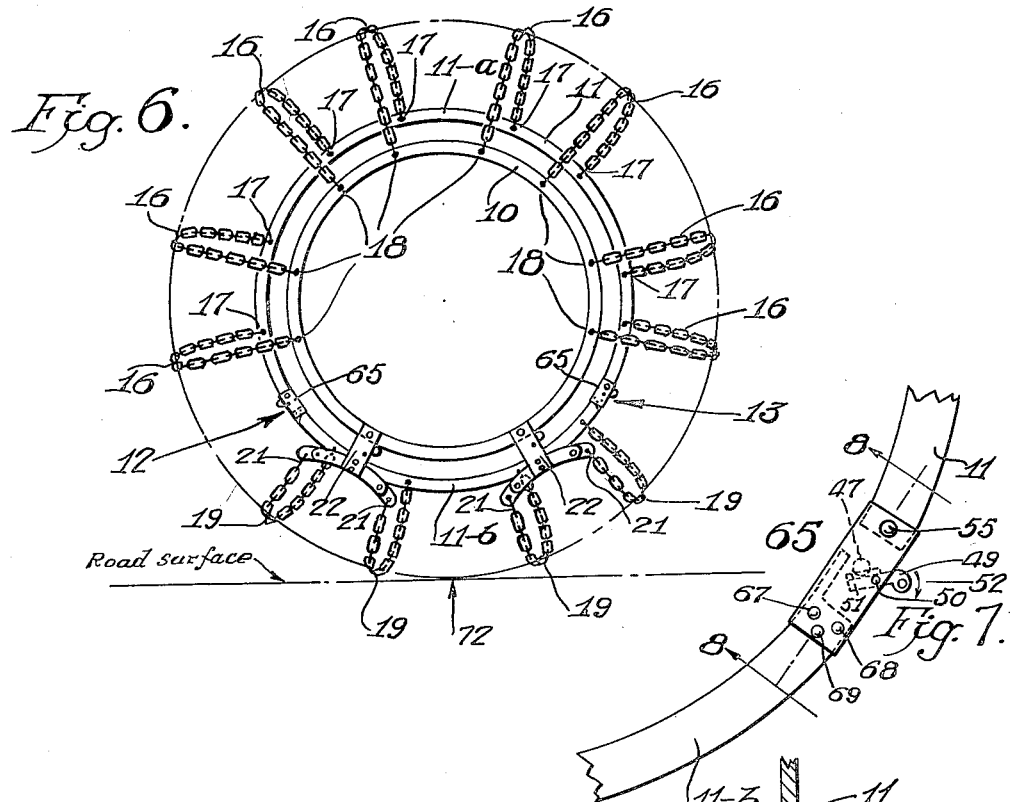
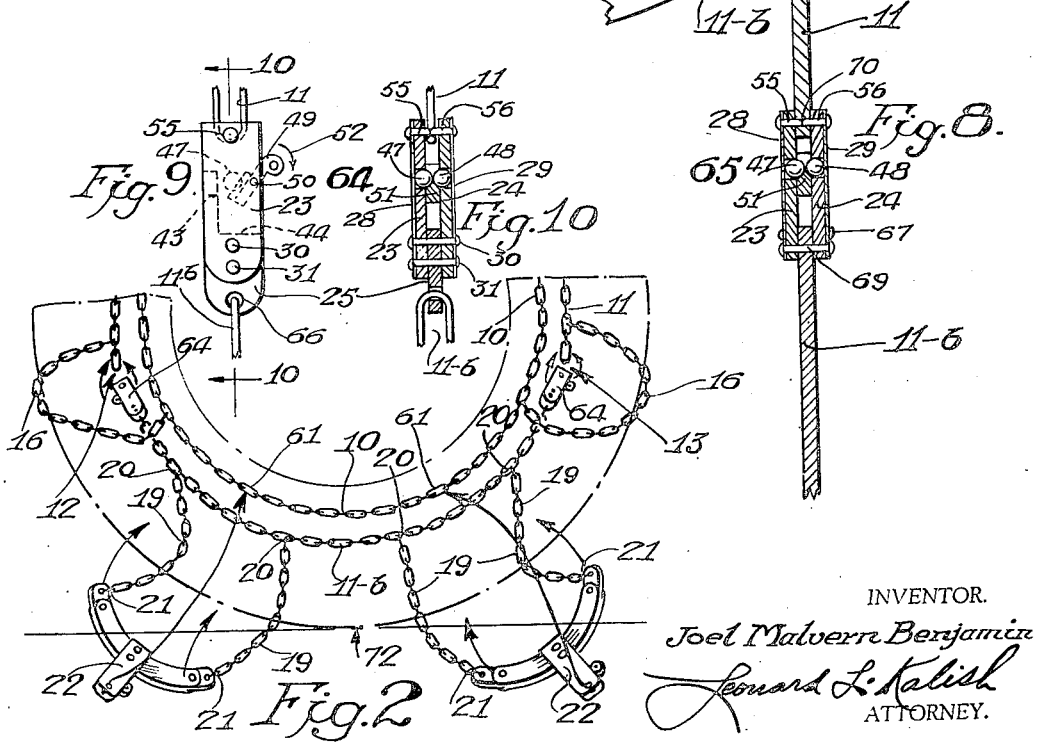
INVENTOR.
Joel Malvern Benjamin
Leonard L. Kalish
ATTORNEY.

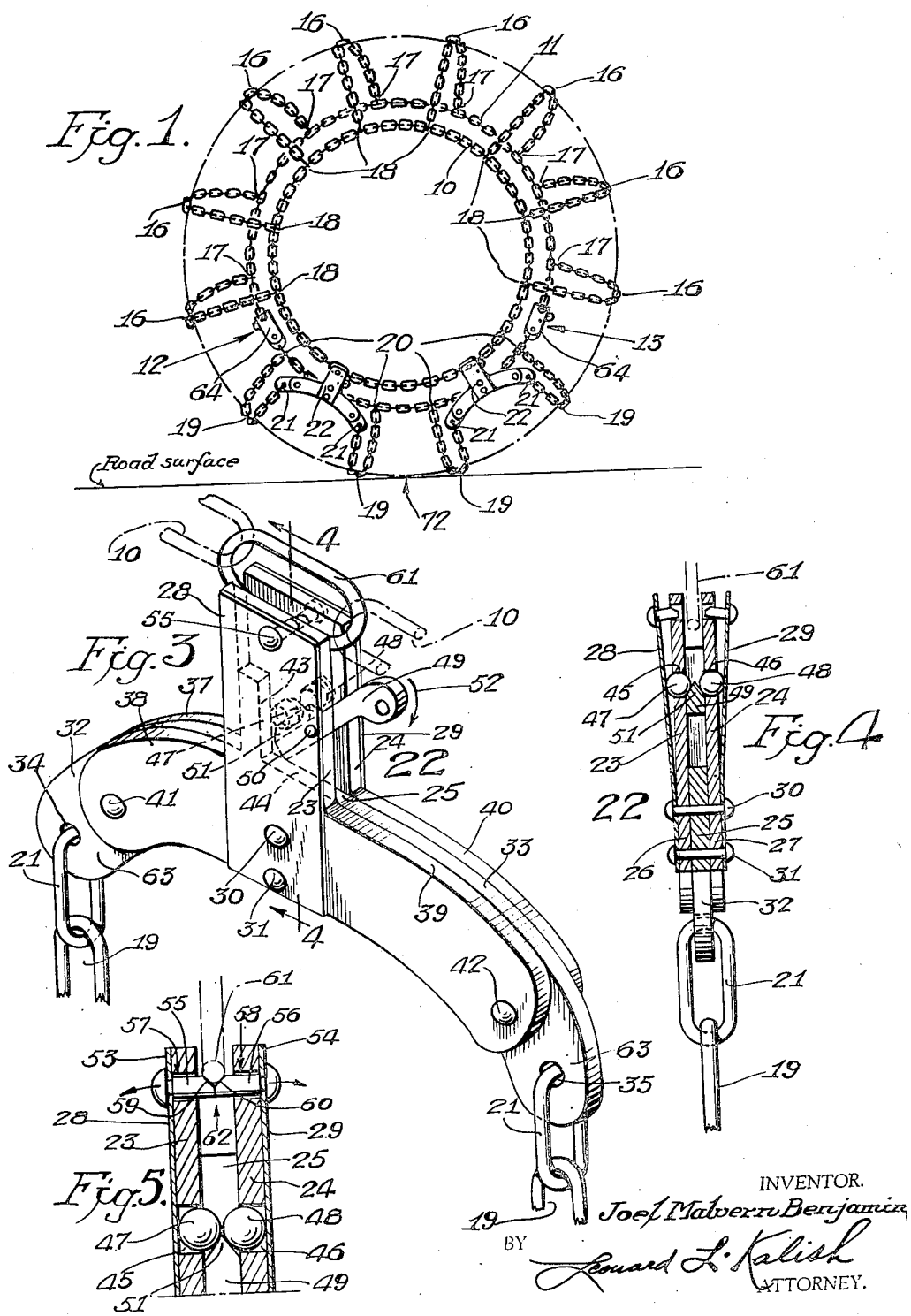

Patented Nov. 19, 1940

2,222,393

UNITED STATES PATENT OFFICE 2,222,393

ANTISKID CHAIN

Joel Malvern Benjamin, Philadelphia, Pa.

Application July 6, 1939, Serial No. 282,960

3 Claims. (Cl. 152—241)

The present invention relates to new and useful improvements in antiskid chains for automobiles.

The two principal types of antiskid chains heretofore used have been of the type commonly referred to in the field as the "full chains" or the other type which were commonly referred to in the field as "individual" chains.

The "full chains" generally included a pair of parallel annular or peripheral chains or links forming a generally continuous circuit concentric with the wheel, one on each side of the wheel, and cross chains or tread chains at frequent intervals extending from one of these parallel chains to the other around the outer periphery of the tire;—the ends of the tread chains or tread members being permanently attached to the annular or peripheral chain members, while each of the annular or peripheral chains or members were provided with a detachable link or connecting member at corresponding points in their peripheries, so that they could be opened up at that point for the purpose of applying the antiskid device to the tire or for the purpose of removing the antiskid device from the tire. These so-called "full chains" possess the disadvantage that they are difficult to apply to the tire or they are difficult to mount on the tire, and also somewhat difficult to remove from the tire. Thus, to mount one of these "full chains" on the tire, it is first necessary to jack up the wheel off the ground so as to permit the chain to be wrapped around the whole periphery of the tire, or the chain in its opened condition must be spread out on the ground parallel with the direction of the car and then the wheel run onto the chain to a sufficient extent so that by wrapping the rest of the chain around the periphery of the tire, the two ends of the two parallel peripheral or retaining chains may be brought together and hooked together by the fastening device provided for that purpose.

The "individual" chains have the advantage of being more readily mounted on the automobile insofar as it is merely necessary to lace them through the spokes of the wheel and fasten them. However, these individual chains have the other disadvantage of being less effective unless a great many of them are applied to the tire, and have the further disadvantage that they are not applicable to solid disc type automobile wheels in general use, unless slots or openings are provided through which the strap or fastening member of the "individual" chain can be extended. Many disc type automobile wheels are provided without any openings whatever, while others are provided with only three equally spaced openings which permit the application of three so-called "individual" chains. It is well known, however, that merely providing three sets of "individual" chains on an automobile tire wheel does not provide the maximum protection against skidding, because the major part of the periphery of the automobile tire is without any cross chains or tread chains, and hence while such major parts of the tire periphery are in contact with the ground no antiskid effect whatever can be depended upon.

To overcome the disadvantages of both the now conventional "full" chains and the now conventional "individual" chains, the present invention provides a "full" chain differing from those heretofore in use.

The antiskid chain construction of the present invention not only gives the maximum antiskid effect of a "full chain" and requires no openings through the disc wheel, but may also be applied to or mounted upon the wheel or tire without either jacking up the tire or without moving the car or wheel.

For the purpose of illustrating the invention, there are shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangement and organization of the instrumentalities as herein shown and described.

In the accompanying drawings in which like reference characters indicate like parts, Figure 1 represents a side elevational view of an antiskid chain embodying the present invention, shown in a generally assembled condition.

Figure 2 represents a fragmentary view of an antiskid chain embodying one form of the present invention, shown partly opened up, as when it is being mounted on the tire.

Figure 3 represents a perspective view of one form of chain connector forming part of one phase of the present invention.

Figure 4 represents a sectional view on line 4—4 of Figure 3.

Figure 5 represents a fragmentary sectional view on line 4—4 of Figure 3, on an enlarged scale.

Figure 6 represents a side elevational view of an antiskid chain embodying a modified form of the present invention.

Figure 7 represents a fragmentary elevational view of the inner girth member or retainer member of the antiskid chain of the modified form of construction shown in Figure 6, showing particularly one of the two connectors forming part of the inner girth member or retainer member.

Figure 8 represents a section on line 8—8 of Figure 7.

Figure 9 represents a side elevational view of a connector member similar to that shown in Figures 1, 3, 4, 5 and 6, but of a modified form of construction, for connecting single tread chains instead of pairs, as in Figures 1, 3 and 6.

Figure 10 represents a section on line 10—10 of Figure 9.

In one phase of the present invention a pair of generally annular retainer members or girth members 10 and 11 are provided either formed of chain, as indicated in Figures 1, 2 and 3, or formed of cable or steel rod, or of a flat steel or iron band as shown in Figures 6, 7 and 8. If formed of cable or steel rod, then suitable loops or eyelets or links may be formed in or on the cable or rod, or welded or otherwise attached thereto, for receiving the anchored ends of the cross-chains or tread members and the connectors 22 or 64.

The inner annular retainer member or girth member 11 is interrupted at either one or two points indicated by the numerals 12 and 13. When using a more or less rigid inner girth member, as for instance that indicated in Figures 6, 7 and 8, then the inner girth member must be interrupted at both points 12 and 13, while when using a flexible inner girth member, as for instance that formed of chain (or flexible cable) as indicated in Figures 1 and 2, then it is sufficient to interrupt the inner girth member 11 merely at one of the two points 12 or 13. While in Figures 1 and 2, the inner girth member 11 (of chain) is shown as being interrupted at both 12 and 13, this is merely to illustrate the possibility of such dual interruption of a chain (or cable or other flexible) form of inner girth member, although it will be understood that in practice it is sufficient if an inner girth member of chain or other flexible formation is interrupted merely at a single point which may be either 12 or 13. If the inner girth member 11 is interrupted at two points, as for instance at 12 and 13 in Figure 6, then the points 12 and 13 may be either diametrically opposite to each other, or they may be somewhat less than 180° apart, so that the inner girth member is thereby divided into a major and a minor portion 11—a and 11—b, respectively, as indicated more particularly in Figure 6. The cross chains or tread chains or members 16 intermediate the part 11—a of the inner retainer member or girth member 11 are arranged with their inner ends 17 as well as their outer ends 18 permanently connected to the inner girth member 11 and to the outer girth member 10, respectively. The transverse tread members 19 intermediate the part 11—a of the inner girth member 11 and the juxtaposed part of the outer girth member 10 have their inner ends 20 permanently attached to the inner girth member 11, while their outer ends 21 are detachably connected to the juxtaposed part of the outer girth member 10, through intervening quick-detachable connectors 22 or 64.

One form of the connector 22 is shown on a larger scale (more or less approximately full size) in Figures 3, 4 and 5. The form of connector 22 shown in Figures 3, 4 and 5 may be formed of a pair of parallel flat steel bars 23 and 24, spaced from each other a suitable distance by an intermediate flat steel bar 25 intermediate the riveted (or spot-welded) ends 26 and 27 thereof, which are flanked by leaf-springs 28 and 29, respectively, all held together at one end by rivets 30 and 31. The spacer bar or member 25 may be provided with lateral extensions 32 and 33, preferably integral with the spacer member 25, and forming therewith a yoke-like formation, the outer terminals of which are perforated as at 34 and 35 to receive the end links 21 of the tread chains 19. If desired, the steel bars 23 and 24 may also be provided with lateral extensions 37, 38, 39 and 40 also preferably formed integrally with their respective members 23 and 24 and slightly shorter than the extensions 32 and 33, and riveted thereto (or spot-welded thereto) as at 41 and 42.

The central spacing bar 25 is shorter than the outer bars 23 and 24, and may be cut out along the lines indicated by 43 and 44. The bars 23 and 24 are further provided with registering openings 45 and 46, which constitute sockets for receiving the balls 47 and 48. Between the bars 23 and 24, a wedging lever 49 is pivotally mounted through the pivot pin 50 which extends through the bars 23 and 24 and through the wedging lever 49. The part of the wedging lever 49 which is in operative juxtaposition to the balls 47 and 48 is tapered to a wedge form 51, so that when the lever is deflected in the direction of the arrow 52, the wedge-like edge 51 of the lever 49 will be forced between the balls 47 and 48 and will force them apart. The balls 47 and 48 in turn bear against and force outwardly the free ends of the leaf-springs 28 and 29. To the outermost ends 53 and 54 of the leaf-springs 28 and 29, a pair of similar locking bolts or pins 55 and 56 are fixedly secured by riveting (or by other equivalent means) in the manner indicated more particularly in Figure 5. The bolts or pins 55 and 56 extend through corresponding openings 57 and 58 in the bars 23 and 24 which are fitted sufficiently closely to give suitable support to the pins or bolts 55 and 56.

The ends 59 and 60 of the pins or locking bolts 55 and 56 are preferably bevelled on the sides facing outwardly, so that the connector device may be snapped onto the links 61 of the outer retainer chain 10, by merely being pushed against the links in the direction of the arrow 62 (Figure 5).

To unlock the connector 22, it is merely necessary to pull the lever 49 outwardly in the direction of the arrow 52, thereby forcing the leaf-springs 28 and 29 apart, and thereby also spreading apart the ends of the locking bolts 55 and 56 so as to release them from the link 61.

In the embodiment of the invention shown in Figures 1, 2, 3 and 6, adjacent pairs of the cross chains or tread chains 19 are arranged with their detachable ends 21 connected to the transverse yoke-like members 63 (composed of the extensions 32 and 33) of the dual connectors 22 illustrated particularly in Figures 3, 4 and 5, which are similar to the single connector 64 shown in Figures 9 and 10 and the single connector 65 shown in Figures 7 and 8, but without the yoke-forming lateral extension 32 and 33 (and 37, 38, 39 and 40).

The single connector designated generally by the numeral 64 consists generally of the same elements as the double or dual type connector designated generally by the numeral 22, and may be used in place of the dual type connector 22, by simply using a separate connector 64 on the detachable ends 21 of each of the tread chains 19. The single type connector 64 is also used at the gap 12 or 13, or both, in the chain type inner girth member 11 as indicated particularly in Figures 1 and 2.

In the connector 64, the spacer member 25 is merely extended downwardly a slight distance beyond the members 23 and 24, and is perforated at 66, to receive the terminal link 21 of one of the tread chains 19, or to receive the terminal link of the inner girth chain 11, according to whether the connector 64 is used for the tread chains or for the girth chain. In the particular illustration shown in Figures 9 and 10, the connector 64 is shown as though used in the inner girth chain, namely, between the major portion 11 thereof and the inner portion 11—b thereof.

The connector 65, as shown generally in Figures 7 and 8 and also in Figure 6, is similar to the connectors 22 and 64 illustrated in Figures 3, 4, 5, 9 and 10, except that it is devoid of the lateral extensions 32 and 33 and is also devoid of the lateral extensions 37, 38, 39 and 40, of the dual connector 22, and instead of being necessarily loosely linked as are the connectors 22 and 64 (see Figures 9 and 10, for instance) may instead be rigidly affixed to the steel band type of inner girth member 11—b as shown particularly in Figures 6, 7 and 8. In this form of construction, the inner girth member 11—b (Figure 8) serves as the spacer member between the two steel bars or members 23 and 24, which are riveted to it by means of the rivets 67, 68 and 69, or may be otherwise secured thereto as for instance by spot welding or the like. In this form of construction, the other inner girth member 11 (Figures 6, 7 and 8) is merely provided with an aperture 70 at its end to receive the locking pins or bolts 55 and 56 of the connector 65 (see Figure 8).

When using a chain type inner girth member, as for instance that shown in Figures 1 and 2, one of the gaps 12 or 13 may be omitted, and indeed is preferably omitted, so that only a single connector 64 need be used in the inner girth of the chain type as shown in Figures 1 and 2. In the drawings Figures 1 and 2, both gaps 12 and 13 are shown, merely for purposes of illustration;—it being understood that one of these may be omitted and the chain continued without any gap at one of these points 12 or 13. In the use of the more or less rigid type of inner girth member shown in Figures 6, 7 and 8, both gaps 12 and 13 are necessary, although in place of one of the connector members 65 in the form of construction shown in Figures 6, 7 and 8, the inner girth member may be hinged at that point with any suitable form of pivotal connection so that the two parts of the girth member may be swung open in respect to each other at the hinged point;—utilizing the connector 65 at the other gap to close the girth member.

In mounting the antiskid chain of the present invention upon a tire, it is merely necessary to open the inner girth member at one or two points, as the case may be, and place the upper half over the top of the tire and then connect the connector 65 or 64 (as the case may be) of the inner girth member, so as to complete or close the inner girth member, and then it is merely necessary to bring outwardly the detachable tread chains 19 and connect their outer ends to the outer girth member 10 by means of the dual type connectors 22, or by an equivalent number of single connectors 64, as illustrated particularly in Figure 2 wherein the arrows show the direction in which the detachable tread chains 19 are swung outwardly and upwardly to meet the outer girth member 10.

Because the detachable tread members or tread chains 19 can be disposed on either side of the road-contact point 72 of the wheel, it is not necessary to move the wheel or to move the vehicle in order to mount the chains on the wheel.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed as new and desired to be secured by Letters Patent is:

1. An antiskid device for rubber tired automobile wheels, comprising a generally annular and generally uninterrupted outer girth chain, a generally annular inner girth chain interrupted at one point and having quick-attachable and detachable connector means at its ends at said point of interruption for detachably connecting the ends thereof, a suitable number of circumferentially distributed tread chains extending and operatively interposed between said outer girth chain and said inner girth chain, with at least four successively adjacent tread chains on one side of said point of interruption of said inner girth chain having one of their ends attached to pairs of dual connector members adapted for quick attachable and quick detachable connection with links of said outer girth chain.

2. An antiskid device for rubber tired automobile wheels, comprising a generally annular and generally uninterrupted outer girth chain, a generally annular inner girth chain interrupted at one point and having quick-attachable and detachable connector means at its ends at said point of interruption for detachably connecting the ends thereof, a suitable number of circumferentially distributed tread chains extending and operatively interposed between said outer girth chain and said inner girth chain, with at least four successively adjacent tread chains on one side of said point of interruption of said inner girth chain having one of their ends attached to pairs of dual connector members adapted for quick attachable and quick detachable connection with links of one of said girth chains.

3. As a new article of manufacture, an antiskid device comprising a continuous girth member for positioning against the outer face of a tire, a second girth member open at one point for positioning against the inner face of said tire, a coupling for connecting the ends of said open girth member in quick open and closed relation, a plurality of traction members, each permanently connected at its ends to the respective girth members, a second plurality of traction members, one beside another, and permanently connected at one end to one girth member, and connecting means for joining the free ends of said second plurality to the other girth member with quick coupling and uncoupling action, whereby said device can be placed in operative relation while the tire is upon the ground and stationary.

JOEL MALVERN BENJAMIN.